Patented May 5, 1931

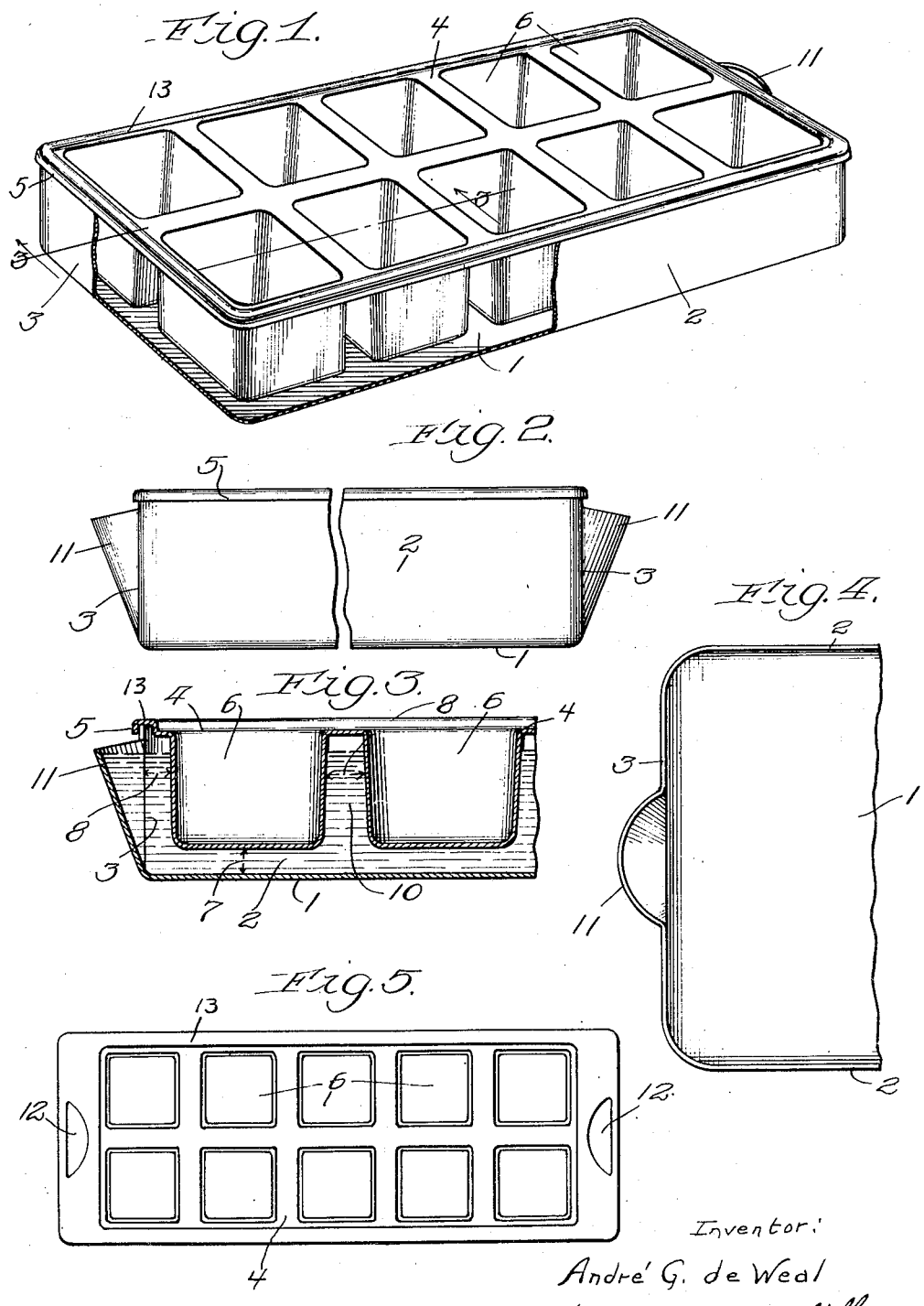

1,804,324

UNITED STATES PATENT OFFICE

ANDRÉ G. DE WEAL, OF CHICAGO, ILLINOIS

ICE CUBE PAN FOR REFRIGERATORS

Application filed May 16, 1929. Serial No. 363,498.

My invention relates to a utensil to be used in refrigerators for making ice blocks of a suitable size for use in cooling drinking water or other liquids.

In utilizing household refrigerators for the producing of ice in small quantities, it has heretofore been customary to employ a shallow pan into which the water is poured, this pan being divided into compartments by vertical and intersecting partition strips so that a block of ice is frozen in each compartment. When the freezing has been effected, the ice adheres to the side walls and the bottom of the pan, and also to the partition strips, so that the resulting blocks of ice cannot readily be detached.

To free these ice blocks, it usually is necessary to set the pan into hot water for a sufficient length of time so that the ice will thaw off the bottom and the sides of the pan, after which the partition strips together with the ice blocks can be taken out of the pan as a unit, if these strips constitute a removable assembly. Even then, hot water may need to be run over this detached unit to loosen the blocks of ice from the partition strips.

This procedure not only consumes considerable time but also causes a considerable portion of the ice to be melted by the hot water, thus resulting in an undesirable waste of ice. Moreover, the partition strip assembly usually has the strips all set vertical, so that the ice blocks are initially formed with parallel sides and hence will not slide easily out of the compartments until considerable surface portions of the blocks have been melted off. So also, the partition strip and ice block assembly cannot easily be lifted out of the pan even when loosened from the latter, making the entire procedure both tedious and wasteful. Moreover, if the partition strips are fastened to the pan, the detaching of the ice blocks usually involves an even greater waste of ice.

My present invention aims to overcome these objections by providing an ice-making utensil which will readily permit the resulting blocks of ice to be loosened without a direct contact of the needed hot water with the ice, thereby greatly reducing the waste of ice; by forming the ice blocks in cup-like recesses depending into a pan and spaced so that hot water can readily flow under and around each such recess to loosen each block from the corresponding recess; by tapering each recess so that the block housed by it can readily be removed when only a slight surface portion of the block has melted; by forming the assemblage so that hot water can readily be poured into the pan; and by forming the recesses in a metal member which will not freeze to the pan and which can readily be grasped for lifting it off the pan.

Still further and also more detailed objects will appear from the following specification and from the accompanying drawings, in which Fig. 1 is a perspective view of an ice-forming utensil embodying my invention, with portions of the side walls of the pan and of the form member broken away.

Fig. 2 is a fragmentary and enlarged side elevation of the same utensil.

Fig. 3 is a fragmentary and enlarged vertical section taken along the line 2—2 of Fig. 1.

Fig. 4 is a fragmentary plan view of the pan alone.

Fig. 5 is a plan view of another embodiment of my invention, namely one in which each of the water inlets consists of a perforation in the cover member.

In the embodiment of Figs. 1 to 4, my ice-forming utensil includes a pan (having a flat bottom 1, upright sides 2, and upright ends 3) and a form member supported by the pan. This form member includes a generally flat plate 4 having a raised rim portion 13 seated on the upper edges of the sides and ends of the pan and a depending peripheral flange 5 which closely overhangs these pan ends and sides to center the form member with respect to the pan.

Depending from the said plate 4 of the form member, and desirably integral with this plate, are upwardly open cups 6 for receiving the water (or other liquid) which is to be frozen, these cups being here shown as square in horizontal section and as tapering slightly downwardly to facilitate the drawing of such cup-like formations in the single sheet of metal from which the entire form member is stamped. The depth of each cup is less than the interior height of the pan, so as to leave a clear space 7 between the bottom of each cup and the pan bottom 1, and the cup-like formations 6 are so located on the cover member as to leave vertical spaces 8 between the adjacent cups, and also to leave similar vertical spaces between each pan end or side and the cups adjacent to that end or side.

In using my utensil, each cup 6 is filled with water, and the utensil is slipped into the suitably cold part of the refrigerator, thereby exposing the upper surface of the water in each cup direct to the chilled air in the refrigerator while heat is also withdrawn from the water by conduction through the metal of the pan. The filling of the cups is facilitated by my providing a raised rim portion 13 which deters the water from flowing off the plate 4, so that the cups can easily be filled by holding the form member under a faucet.

When the freezing of the water has been effected, each block of ice is socketed in one of the cups and can be loosened from the corresponding cup by warming the latter, which is easily accomplished, since the above mentioned spaces permit a ready access of hot water to the sides and bottoms of the cups.

To effect this loosening of the ice, I desirably pour hot water into the pan in sufficient quantity so that it will extend for a considerable height upwardly into the spaces 8, as shown for example by the water level 10 in Fig. 3. The warming effect of the hot water then quickly loosens the blocks of ice from the cups, so that these blocks will readily slide out of the cups when the form member is inverted, and the downward tapering of the cups facilitates such a detaching of the ice blocks.

To expedite the insertion of the hot water, I desirably provide one of the two members of my utensil with at least one and desirably two freely exposed water inlets, as for example by providing one pan end 3 with a snout 11 projecting endwardly of the pan beyond the peripheral flange 5 of the form member. I may also provide a companion inlet on the other end of the pan, as shown in Fig. 1, so that air can readily circulate through the pan below and around the cups during the freezing operation, although a single inlet will suffice if the form member does not fit the pan tightly. This provision for air circulation permits the initially warm air within the pan to be speedily replaced by cold air during the freezing operation.

In practice, I preferably form the cups or cup-like depressions of rectangular horizontal section, so that only a relatively small spacing will be needed between the adjacent cups, and likewise between the outer cups and the sides and ends of the pan.

However, while I have heretofore described my ice-forming utensil in an embodiment including downwardly tapering cups or cup-like formations of square horizontal sections, and including inlet snouts at both ends of the pan, and have described the form member as supported by the upper edges of the pan, I do not wish to be limited to these or other details of the construction and arrangement thus disclosed. Many changes might obviously be made without departing either from the spirit of my invention or from the appended claims. For example, Fig. 5 shows an embodiment in which the hot water inlets consist of two apertures 12 in the form member.

I claim as my invention:

1. A water freezing utensil for use in a refrigerator, comprising a pan member, and a form member including a peripheral flange seated upon and hooked over the said upper edge to support and center the form member on the pan; the form member having a plurality of depending and cup-like formations arranged in rows and freely spaced both from each other and from the pan.

2. A water freezing utensil for use in a refrigerator; comprising a pan member, and a form member seated upon and centered by the upper edge of the pan member; the form member being provided with cup-like formations spaced horizontally from each other and having their bottoms freely spaced from the bottom of the pan member; one of the said members having an aperture through which hot water may be poured into the pan member without removing the form member from the pan member.

3. A water freezing utensil for use in a refrigerator; comprising a pan member, and a form member seated upon and centered by the upper edge of the pan member; the form member being provided with cup-like formations spaced horizontally from each other and having their bottoms freely spaced from the bottom of the pan member; one of the said members having an aperture disposed considerably above the bottom of the pan member.

4. A water freezing utensil for use in a refrigerator; comprising a pan member having a peripheral flange, and a form member seated upon and centered by the upper edge of the pan member; the form member comprising a flat plate provided with downwardly tapering cup-like formations spaced horizontally from each other and having their bottoms freely spaced from the bottom of the pan member, the form member also having a raised rim portion outward of the said cup-like formations.

5. A water freezing utensil for use in a refrigerator; comprising a pan member, and a form member seated upon and centered by the upper edge of the pan member; the form member being provided with cup-like formations spaced horizontally from each other and having their bottoms freely spaced from the bottom of the pan member; the pan member having an upwardly open snout projecting horizontally beyond the adjacent outer edge portion of the cover member, one of the members also having an aperture affording an air vent considerably above the bottom of the pan.

Signed at Chicago, Illinois, May 9th, 1929.

ANDRÉ G. DE WEAL.